(12) United States Patent
Chen

(10) Patent No.: US 11,393,310 B2
(45) Date of Patent: Jul. 19, 2022

(54) SURVEILLANCE SYSTEM

(71) Applicant: ATEN INTERNATIONAL CO., LTD., New Taipei (TW)

(72) Inventor: Tai-Quan Chen, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 14 days.

(21) Appl. No.: 17/037,328

(22) Filed: Sep. 29, 2020

(65) Prior Publication Data

US 2021/0142635 A1 May 13, 2021

(30) Foreign Application Priority Data

Nov. 13, 2019 (TW) ................... 108141285

(51) Int. Cl.
| | |
|---|---|
| *G08B 13/196* | (2006.01) |
| *G06F 3/14* | (2006.01) |
| *H04L 61/5007* | (2022.01) |
| *H04L 67/141* | (2022.01) |
| *H04N 7/18* | (2006.01) |
| *G09G 5/00* | (2006.01) |

(52) U.S. Cl.
CPC ......... *G08B 13/19645* (2013.01); *G06F 3/14* (2013.01); *H04L 61/2007* (2013.01); *H04L 67/141* (2013.01); *H04N 7/181* (2013.01)

(58) Field of Classification Search
USPC ............................................ 386/200–234
See application file for complete search history.

(56) References Cited

U.S. PATENT DOCUMENTS

| | | | |
|---|---|---|---|
| 2014/0152835 A1* | 6/2014 | Chen ................. | H04N 7/185 348/158 |
| 2018/0025243 A1* | 1/2018 | Chandraker ....... | H04L 63/0861 382/118 |
| 2019/0087519 A1* | 3/2019 | Mercury ............ | G06N 20/00 |
| 2021/0034792 A1* | 2/2021 | Clark ................. | G06F 21/83 |

FOREIGN PATENT DOCUMENTS

| | | |
|---|---|---|
| TW | M453210 U1 | 5/2013 |
| TW | I497975 B | 8/2015 |
| TW | I604422 B | 11/2017 |

* cited by examiner

*Primary Examiner* — Hung Q Dang
(74) *Attorney, Agent, or Firm* — Birch, Stewart, Kolasch & Birch, LLP

(57) ABSTRACT

A surveillance system includes a first electronic device, a second electronic device, an image-capturing unit, and a multi-computer switching unit. The image-capturing unit corresponds to the second electronic device, and the image-capturing unit captures an image of a location of the second electronic device. The multi-computer switching unit is coupled to the first electronic device, the second electronic device, and the image-capturing unit, and the multi-computer switching unit receives the image from the image-capturing unit. When the second electronic device sends a connection request for establishing a communication connection with the first electronic device, the communication connection is established through the multi-computer switching unit, and the multi-computer switching unit outputs the image corresponding to the location of the second electronic device to a surveillance terminal device.

7 Claims, 7 Drawing Sheets

SURVEILLANCE SYSTEM

CROSS-REFERENCE TO RELATED APPLICATION

This non-provisional application claims priority under 35 U.S.C. § 119(a) to Patent Application No. 108141285 filed in Taiwan, R.O.C. on Nov. 13, 2019, the entire contents of which are hereby incorporated by reference.

BACKGROUND

Technical Field

The instant disclosure relates to a surveillance system, in particular, to a surveillance system integrated with the multi-computer switching unit and images of electronic devices.

Related Art

Along with the innovation of technologies and improvements in quality of life, the security for the living environments becomes an important issue. The scope of the living environments contains residences, offices, laboratories, factories, financial institutes, and other public places. Recently, many industries are devoted in the developments of surveillance systems. Specifically, one surveillance system known to the inventor can continuously monitor the scene of a certain region and can store the monitor frames for the monitored scenes. Therefore, security personnel can check the monitor frames when necessary to ensure the safety of the personnel and the properties within the certain region being monitored.

SUMMARY

However, when the security personnel checks the monitor frames, the security personnel has to search abnormal monitor images from a plenty of monitor frames being stored. As a result, the searching is time consuming. Moreover, because the monitor frames are checked manually, the security personnel may fail to figure out every abnormal images. Under this condition, as the monitor frames stored in the surveillance system fail to provide useful information about the security state in the monitored region in an effective manner, the reliability of the surveillance system is doubted, and thus the surveillance system fails to ensure the safety within the living environments.

Moreover, most of the existing surveillance systems known to the inventor are applied in monitoring conditions of certain regions. The surveillance systems are not utilized with the application of computers or servers yet; at most, the surveillance systems use the computers or servers for storing the monitor frames. As a result, the existing surveillance systems fail to provide functions for connecting to or having relation with the computation of computers or servers. It is understood that in an era where the computer and server devices are rapidly developed, the living security in the living environments can be further ensured by improving the application of the surveillance systems.

In view of these, one embodiment of the instant disclosure provides a surveillance system. The surveillance system comprises a first electronic device, a second electronic device, an image-capturing unit, and a multi-computer switching unit. The multi-computer switching unit is coupled to the first electronic device, the second electronic device, and the image-capturing unit. The image-capturing unit is adapted to capture an image of a location of the second electronic device. The multi-computer switching unit is adapted to receive the image from the image-capturing unit. When the second electronic device sends a connection request for establishing a communication connection with the first electronic device, the second electronic device and the first electronic device establish the communication connection through the multi-computer switching unit, and the multi-computer switching unit outputs the image corresponding to the second electronic device to a surveillance terminal device.

Another embodiment of the instant disclosure provides a surveillance system. The surveillance system comprises a first electronic device, a second electronic device, an image-capturing unit, and a multi-computer switching unit. The multi-computer switching unit is coupled to the first electronic device, the second electronic device, and the image-capturing unit. The image-capturing unit is adapted to capture an image of a location of the first electronic device. When the second electronic device sends a connection request for establishing a communication connection with the first electronic device, the multi-computer switching unit establishes the communication connection between the second electronic device and the first electronic device. The multi-computer switching unit is adapted to receive the image. When the multi-computer switching unit analyzes and judges that the image is abnormal, the multi-computer switching unit outputs the image to a surveillance terminal device.

Yet another embodiment of the instant disclosure provides a surveillance system. The surveillance system comprises a first electronic device, a second electronic device, a third electronic device, an image-capturing unit, and a multi-computer switching unit. The multi-computer switching unit is coupled to the image-capturing unit, the second electronic device, and the third electronic device. The first electronic device comprises a light-indicating unit. The light-indicating unit is adapted to indicate if the first electronic device is abnormal. The second electronic device is coupled to the first electronic device. The second electronic device is adapted to display a desktop image presenting an operation state of the first electronic device. The image-capturing unit is adapted to capture an image of the light-indicating unit. When the second electronic device sends a connection request for establishing a communication connection with the third electronic device, the multi-computer switching unit establishes the communication connection between the second electronic device and the third electronic device. The multi-computer switching unit is adapted to receive the image of the light-indicating unit. When the multi-computer switching unit judges that the image of the light-indicating unit is abnormal, the multi-computer switching unit outputs the image of the light-indicating unit or the desktop image to a surveillance terminal device.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
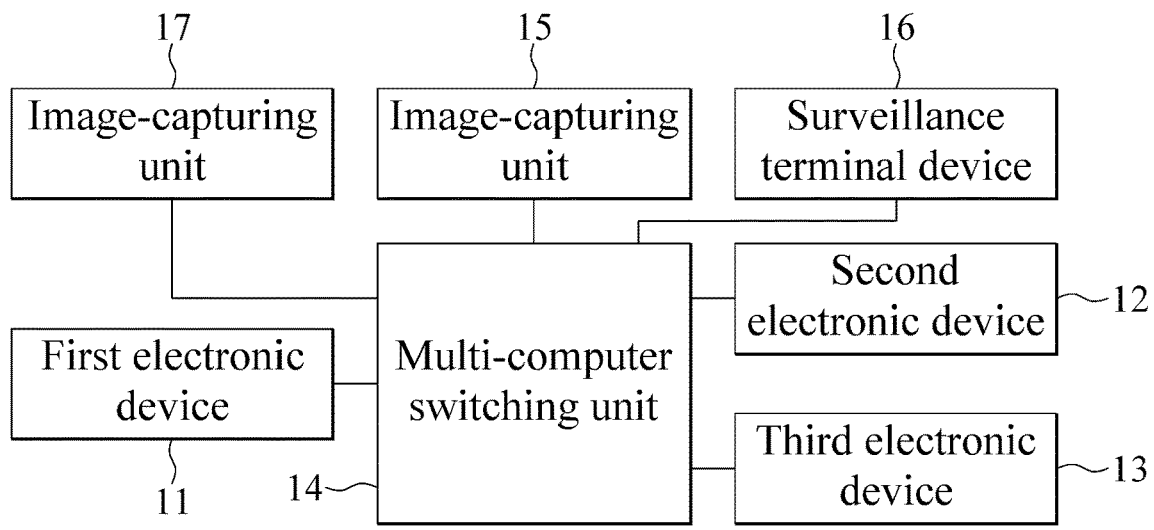
FIG. 1 illustrates a block diagram of a surveillance system according to a first embodiment of the instant disclosure.

Please refer to FIG. 1. FIG. 1 illustrates a block diagram of a surveillance system according to a first embodiment of the instant disclosure. It is understood that, the number of the electronic devices shown in FIG. 1 is three for an illustrative example, but embodiments of the instant disclosure are not limited thereto, the number of the electronic devices in the system may be two or more than three. As shown in FIG. 1, the surveillance system comprises a plurality of electronic devices 11, 12 (for the sake of convenience, hereinafter a first electronic device 11 and a second electronic device 12), a multi-computer switching unit 14 (in this embodiment, a keyboard-video-mouse switch (KVM switch) is used as an illustrative example, but embodiments of the instant disclosure are not limited thereto), and an image-capturing unit 15. The surveillance system is coupled to a surveillance terminal device 16. The multi-computer switching unit 14 is coupled between the first electronic device 11, the second electronic device 12, the image-capturing unit 15, and the surveillance terminal device 16.

The multi-computer switching unit 14 can be used to establish a communication connection between the first electronic device 11 and the second electronic device 12; that is, the second electronic device 12 can be connected to the first electronic device 11 or log in the first electronic device 11 through the multi-computer switching unit 14. For example, the second electronic device 12 may comprise an input device (e.g., a keyboard, a mouse, or a touchpad), and the user of the second electronic device 12 can operate the input device to allow the second electronic device 12 to be connected to the first electronic device 11 through the multi-computer switching unit 14. Alternatively, in another example, the user of the second electronic device 12 can use the input device to input account name and password to log in the first electronic device 11 for the subsequent operations of the first electronic device 11. In one embodiment, the multi-computer switching unit 14 can generate a control signal for controlling the first electronic device 11 according to the input signal generated by the input device, so that the user of the second electronic device 12 can operate the first electronic device 11 through the input device, or so that a data transmission between the first electronic device 11 and the second electronic device 12 can be achieved. It is understood that, conversely, the first electronic device 11 can be connected to the second electronic device 12 or log in the second electronic device 12 through the multi-computer switching unit 14 for the subsequent operations of the second electronic device 12.

Figure 2:
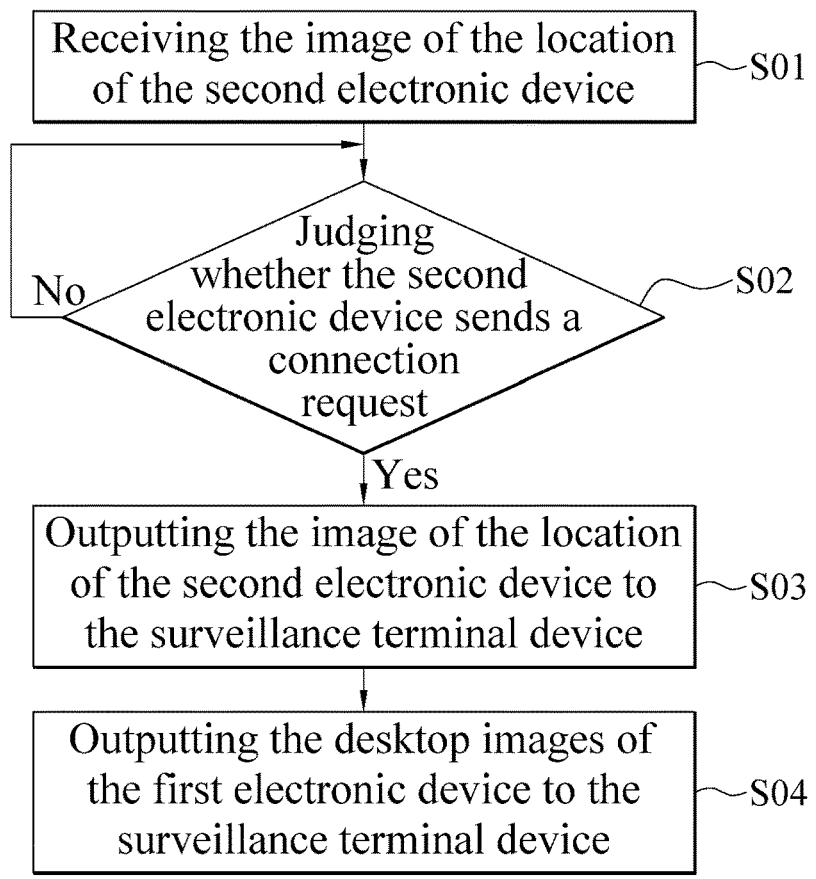
FIG. 2 illustrates a flowchart of a surveillance method of the surveillance system of the first embodiment.

The image-capturing unit 15 corresponds to the second electronic device 12, and the image-capturing unit 15 captures an image of a location of the second electronic device 12 (i.e., the location where the second electronic device 12 is located). The image-capturing unit 15 sends the image of the location of the second electronic device 12 to the multi-computer switching unit 14. The multi-computer switching unit 14 judges if the image of the location of the second electronic device 12 is sent to the surveillance terminal device 16 to inform the personnel at the surveillance terminal device 16 according to the result if the second electronic device 12 tends to establish the communication connection with the first electronic device 11. In detail, please refer to FIGS. 1 and 2, where FIG. 2 illustrates a flowchart of a surveillance method of the surveillance system of the first embodiment. In this embodiment, during the operation, the multi-computer switching unit 14 receives the image of the location of the second electronic device 12 from the image-capturing unit 15 (step S01), and the multi-computer switching unit 14 judges if the second electronic device 12 sends the connection request for establishing the communication connection with the first electronic device 11 (step S02), so that the multi-computer switching unit 14 establishes the communication connection between the second electronic device 12 and the first electronic device 11. Moreover, when the second electronic device 12 sends the connection request (that is, the judgement result in the step S02 is yes), the multi-computer switching unit 14 outputs the image of the location of the second electronic device 12 to the surveillance terminal device 16 (step S03).

Therefore, when the surveillance terminal device 16 receives the image of the location of the second electronic device 12, the personnel at the surveillance terminal device 16 can instantly check the person who use the second electronic device 12 to connect to the first electronic device 11. In other words, the personnel at the surveillance terminal device 16 can check the image of the location of the second electronic device 12 on the surveillance terminal device 16 so as to know who is the person using the second electronic device 12 to connect to the first electronic device 11. Accordingly, the multi-computer switching unit 14 integrates the images captured by the image-capturing unit 15, and the personnel at the surveillance terminal device 16 can perform an instant treatment according to the image(s) instantly sent by the multi-computer switching unit 14. Therefore, the personnel at the surveillance terminal device 16 does not need to check an image of a location of a third electronic device (or even a fourth electronic device, a fifth electronic device, and so forth). In other words, under this configuration, the personnel at the surveillance terminal device 16 does not have to playback all the images captured by the image-capturing unit 14 for searching the person who remote operates the first electronic device 11, thereby improving the convenience and the reliability of the surveillance system.

In one embodiment, the two electronic devices 11, 12 may be personal computers (e.g., desktop computers or notebook computers), industrial computers (e.g., servers) or tablet computers.

In one embodiment, the image-capturing unit 15 may be a video recorder, a camera, or other electronic device with video recording function or image capturing function, and the video recorder, the camera, and the electronic devices conform to the protocols regulated by open network video interface forum (ONVIF).

In one embodiment, the multi-computer switching unit 14 may be coupled to the image-capturing unit 15 and the surveillance terminal device 16 through wired or wireless communication technologies (such as Bluetooth communication technologies, WIFI communication technologies, or Cellular network communication technologies (which may be of the $3^{rd}$ generation, the $4^{th}$ generation, or the $5^{th}$ generation)).

In one embodiment, the surveillance terminal device 16 may be located at a management control center.

In one embodiment, the connection request may be a request signal between the second electronic device 12 and the first electronic device 11, and the request signal conforms to the internet protocol. In another embodiment, the connection request may be a request signal that the second electronic device 12 sends to the first electronic device 11 after the user inputs the account name and the password in the second electronic device 12.

In one embodiment, the communication connection may be a connection established by internet communication technologies and between the second electronic device 12 and the first electronic device 11. In other words, in this embodiment, after the second electronic device 12 sends the connection request, the first electronic device 11 and the second electronic device 12 perform a handshake process (hereinafter, handshake). After the handshake for confirming the admission of the communication connection, the first electronic device 11 and the second electronic device 12 can establish the communication connection; that is, the first electronic device 11 is communicable with the second electronic device 12.

In one embodiment, the image of the location of the second electronic device 12 contains the image of an adjacent location of the location of the second electronic device 12, and the person can operate the second electronic device 12 at the adjacent location. Taking that the second electronic device 12 is located in an office as an example, the image of the location of the second electronic device 12 may further contain the image of the seat of the person at the second electronic device 12. In other words, in this embodiment, the image-capturing unit 15 is located at a place of the location of the second electronic device 12, and the image-capturing unit 15 is adapted to obtain and utilize the image of the person who uses the second electronic device 12 anytime.

In one embodiment, the surveillance system may further comprise another electronic device 13 (hereinafter, a third electronic device 13). The third electronic device 13 is coupled to the multi-computer switching unit 14. The third electronic device 13 can be connected to the first electronic device 11 through the multi-computer switching unit 14. That is, in this embodiment, the multi-computer switching unit 14 may further establish a communication connection between the first electronic device 11 and the third electronic device 13. Accordingly, the image-capturing unit 15 is adapted to capture an image of a location of the third electronic device 13 and sends the image to the multi-computer switching unit 14. In this embodiment, in the step S02, the multi-computer switching unit 14 further judges if the third electronic device 13 sends a connection request for establishing a communication connection with the first electronic device 11. When the multi-computer switching unit 14 judges that the third electronic device 13 sends the connection request, the multi-computer switching unit 14 establishes the communication connection between the third electronic device 13 and the first electronic device 11. In this embodiment, in the step S03, the multi-computer switching unit 14 outputs the image of the location of the third electronic device 13 to the surveillance terminal device 16, so that the personnel at the surveillance terminal device 16 can realize that the third electronic device 13 is connecting to the first electronic device 11 instantly. Moreover, the personnel at the surveillance terminal device 16 can check who is the person using the third electronic device 13 to connect to the first electronic device 11. Therefore, according to one or some embodiments of the instant disclosure, when the person uses one electronic device to connect to another electronic device, the image-capturing unit 15 can instantly capture the image having the person's image, so that the surveillance terminal device 16 instantly displays the image having the person's image for subsequent treatments. That is, according to one or some embodiments of the instant disclosure, the multi-computer switching unit 14 is adapted to couple to several electronic devices, and the electronic devices can be communicable with each other through the multi-computer switching unit 14 according to different requirements.

Figure 3:
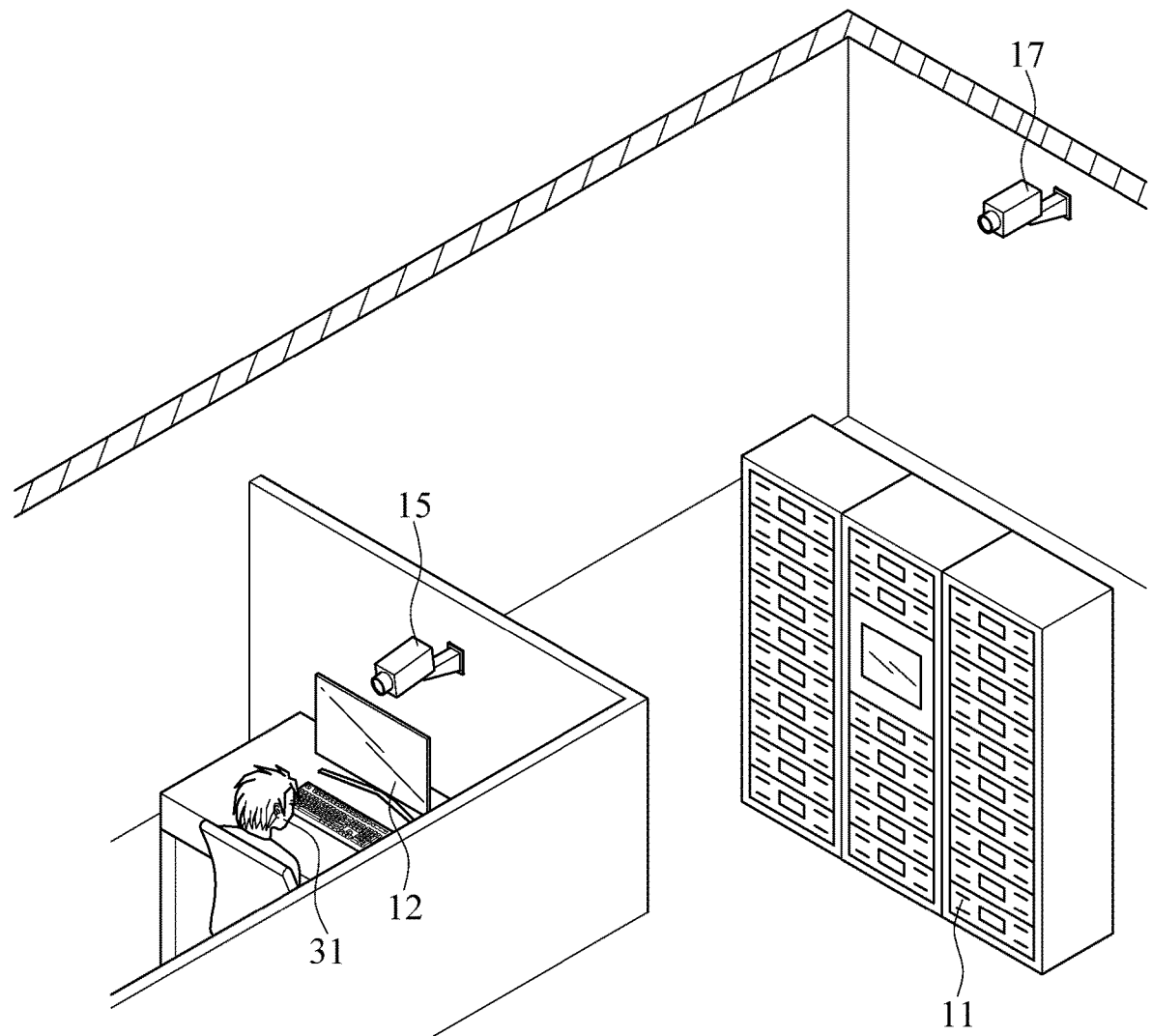
FIG. 3 illustrates a schematic view showing that one implementation of the surveillance system according to an exemplary embodiment is applied in an office.

In one embodiment, taking the case that the surveillance system is applied in an office as an example, as shown in FIG. 3, the image-capturing unit 15 may be assembled on the wall or the ceiling of the office so as to obtain the image of the location of the second electronic device 12. Moreover, when the second electronic device 12 sends the connection request for establishing a communication connection with the first electronic device 11, the image-capturing unit 15 captures the image of the location of the second electronic device 12. In one embodiment, the image may further comprise the facial image of a person 31 operating the second electronic device 12. Hence, after the multi-computer switching unit 14 sends the image to the surveillance terminal device 16, the personnel at the surveillance terminal device 16 can judge if the person 31 operating the second electronic device 12 have the access authority for the first electronic device 11 according to the facial image so as to provide corresponding treatments. Specifically, in one embodiment, the corresponding treatments may be sending personnel to the location of the second electronic device 12, sending out an alarm signal, storing the image of the location of the second electronic device 12 having the facial image, etc., embodiments of the instant disclosure are not limited thereto.

Figure 4:
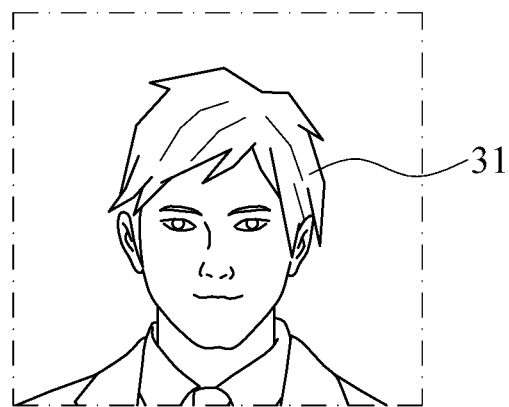
FIG. 4 illustrates a schematic view showing that one implementation of the multi-computer switching unit in FIG. 1 is of a highlighted configuration.

In one embodiment, when the second electronic device 12 establishes the communication connection with the first electronic device 11, the multi-computer switching unit 14 responsively highlights the image of the location of the second electronic device 12. That is, in the step S03, the multi-computer switching unit 14 displays the image of the location of the second electronic device 12 in a highlighted manner and the highlighted image is then outputted to the surveillance terminal device 16; namely, the image is displayed on the surveillance terminal device 16 in the highlighted manner. Accordingly, the personnel at the surveillance terminal device 16 can instantly check if a suspicious person operates the second electronic device 12. In the foregoing example, as mentioned, the image of the location of the second electronic device 12 comprises the facial image of the person 31 operating the second electronic device 12, and the multi-computer switching unit 14 is adapted to display the facial image of the person 31 in a highlighted manner. For instance, as shown in FIG. 4, the multi-computer switching unit 14 may highlight the facial image of the person 31 with a frame. In another example, the surveillance terminal device 16 originally displays an image having the locations of the first electronic device 11, the second electronic device 12, and the third electronic device 13, and the multi-computer switching unit 14 can highlight the location of the second electronic device 12 in the image in the highlight mode. For example, the multi-computer switching unit 14 can indicate the location of the second electronic device 12 in the image from a frame, so that the personnel at the surveillance terminal device 16 can check the person who performs a remote connection to the first electronic device 11 more rapidly. The framing action may be achieved by using image recognition technologies to recognize human faces or objects so as to highlight the human faces or electronic device with frames.

In one embodiment, the connection request sent by the second electronic device 12 may be a control signal for the first electronic device 11, and the control signal may be a keyboard signal, a mouse signal, or a touch signal generated by the input device of the second electronic device 12. In the step S02, the multi-computer switching unit 14 may judge if the second electronic device 12 and the third electronic device 13 send the connection requests by checking if the second electronic device 12 and the third electronic device 13 send the control signal. When the multi-computer switching unit 14 receives the control signal from the second electronic device 12 (i.e., the judgement result is "yes") or when the multi-computer switching unit 14 receives the control signal from the third electronic device 13 (i.e., the judgement result is "yes"), the multi-computer switching unit 14 accordingly execute the step S03 so as to output the image of the location of the second electronic device 12, the image of the location of the third electronic device 13, or the images of the locations of the second electronic device 12 and the third electronic device 13 to the surveillance terminal device 16.

In one embodiment, the first electronic device 11 is provided with a control center video session recorder (CCVSR), so that the operation frames on the first electronic device 11 can be recorded by the CCVSR of the first electronic device 11. Moreover, the first electronic device 11 can send the desktop images generated during the recording process to the multi-computer switching unit 14 periodically. In other words, in this embodiment, the multi-computer switching unit 14 periodically receives a plurality of desktop images from the first electronic device 11, and the multi-computer switching unit 14 further judges if the second electronic device 12 sends the connection request according to the desktop images of the first electronic device 11. Specifically, in this embodiment, when the multi-computer switching unit 14 executes the step S02, the multi-computer switching unit 14 may further judge if the desktop images generated by the first electronic device 11 at different timings are the same so as to judge if the second electronic device 12 already sends the connection request. If the desktop images are the same, namely, the desktop images are not changed, indicating that no one uses the second electronic device 12 to operate the first electronic device 11 through the multi-computer switching unit 14. Conversely, in the case that the desktop images are not the same, indicating that someone uses the second electronic device 12 to operate the first electronic device 11 through the multi-computer switching unit 14 so as to make the desktop images of the first electronic device 11 change. Hence, when the desktop images are not the same, the multi-computer switching unit 14 can accordingly judge that the second electronic device 12 already sends the connection request. Therefore, the multi-computer switching unit 14 executes the step S03 to output the image of the location of the second electronic device 12 to the surveillance terminal device 16. Moreover, the multi-computer switching unit 14 may further output the desktop images of the first electronic device 11 to the surveillance terminal device 16 (step S04), so that the personnel at the surveillance terminal device 16 can realize the sequential operations on the first electronic device 11 by the person according to the changes of the desktop images. Accordingly, in this embodiment, the multi-computer switching unit 14 further integrates the desktop images generated by the first electronic device 11 in the surveillance system so as to further enhance the reliability of the surveillance system.

In one embodiment, the desktop images of the first electronic device 11 comprise the image of an input interface, for example, a graphical user interface (GUI) with columns for inputting account names and passwords. When the multi-computer switching unit 14 judges if the second electronic device 12 sends the connection request according to the desktop images, the multi-computer switching unit 14 can judge if the second electronic device 12 sends the connection request by checking if the frames of the input interfaces in the desktop image change. In other words, in this embodiment, the multi-computer switching unit 14 judges if the second electronic device 12 sends the connection request by checking if the user of the second electronic device 12 inputs the account name or the password.

In one embodiment, the multi-computer switching unit 14 is a network-type switching unit (in this embodiment, the multi-computer switching unit 14 is a KVM-over-IP device, but embodiments of the instant disclosure are not limited thereto). The electronic devices 12, 13 coupled to the multi-computer switching unit 14 have different internet protocol (IP) addresses, and the electronic devices 12, 13 correspond to different image-capturing units. Accordingly, when the second electronic device 12 sends the connection request, firstly the multi-computer switching unit 14 judges the IP address of the electronic device which already sends the connection request, and the multi-computer switching unit 14 selects the image of the location of the corresponding electronic device according to the IP address. Next, the multi-computer switching unit 14 outputs the selected image to the surveillance terminal device 16.

For example, as shown in FIG. 1, the surveillance system may further comprise an image-capturing unit 17 coupled to the multi-computer switching unit 14. The image-capturing unit 17 corresponds to the third electronic device 13 so as to capture the image of the location of the third electronic device 13. Hence, the multi-computer switching unit 14 receives the image of the location of the second electronic device 12 from the image-capturing unit 15 and receives the image of the location of the third electronic device 13 from the image-capturing unit 17. The multi-computer switching unit 14 can selectively output the image of the location of the second electronic device 12 or the image of the location of the third electronic device 13 to the surveillance terminal device 16 according to the connection request sent by the second electronic device 12 or the third electronic device 13. For example, if the second electronic device 12 sends the connection request, the multi-computer switching unit 14 then selects the image-capturing unit 15 corresponding to the IP address of the second electronic device 12 according to the IP address of the second electronic device 12, and the multi-computer switching unit 14 outputs the image of the location of the second electronic device 12 captured by the image-capturing unit 15 to the surveillance terminal device 16. Similarly, if the third electronic device 13 sends the connection request, the multi-computer switching unit 14 then selects the image-capturing unit 17 corresponding to the IP address of the third electronic device 13 according to the IP address of the third electronic device 13, and the multi-computer switching unit 14 outputs the image of the location of the third electronic device 13 captured by the image-capturing unit 17.

In one embodiment, taking the case that the second electronic device 12 is a computer, the second electronic device 12 further comprises output devices (e.g., a screen and a speaker). When the multi-computer switching unit 14 establishes the communication connection between the second electronic device 12 and the first electronic device 11, one of the output devices of the second electronic device 12 displays the desktop frame of the first electronic device 11, and the other output device still plays the sound track generated by the host machine of the second electronic device 12. In other words, when the multi-computer switching unit 14 switches the desktop frame of the first electronic device 11 on the second electronic device 12, the multi-computer switching unit 14 does not need to switch the sound track generated by the first electronic device 11 on the second electronic device 12. That is, in this embodiment, the multi-computer switching unit 14 can just send the desktop frame of the first electronic device 11 to the second electronic device 12 according to different requirements, but embodiments of the instant disclosure are not limited thereto. In some embodiments, the multi-computer switching unit 14 sends the desktop image and the sound track of the first electronic device 11 at the same time.

Figure 5:
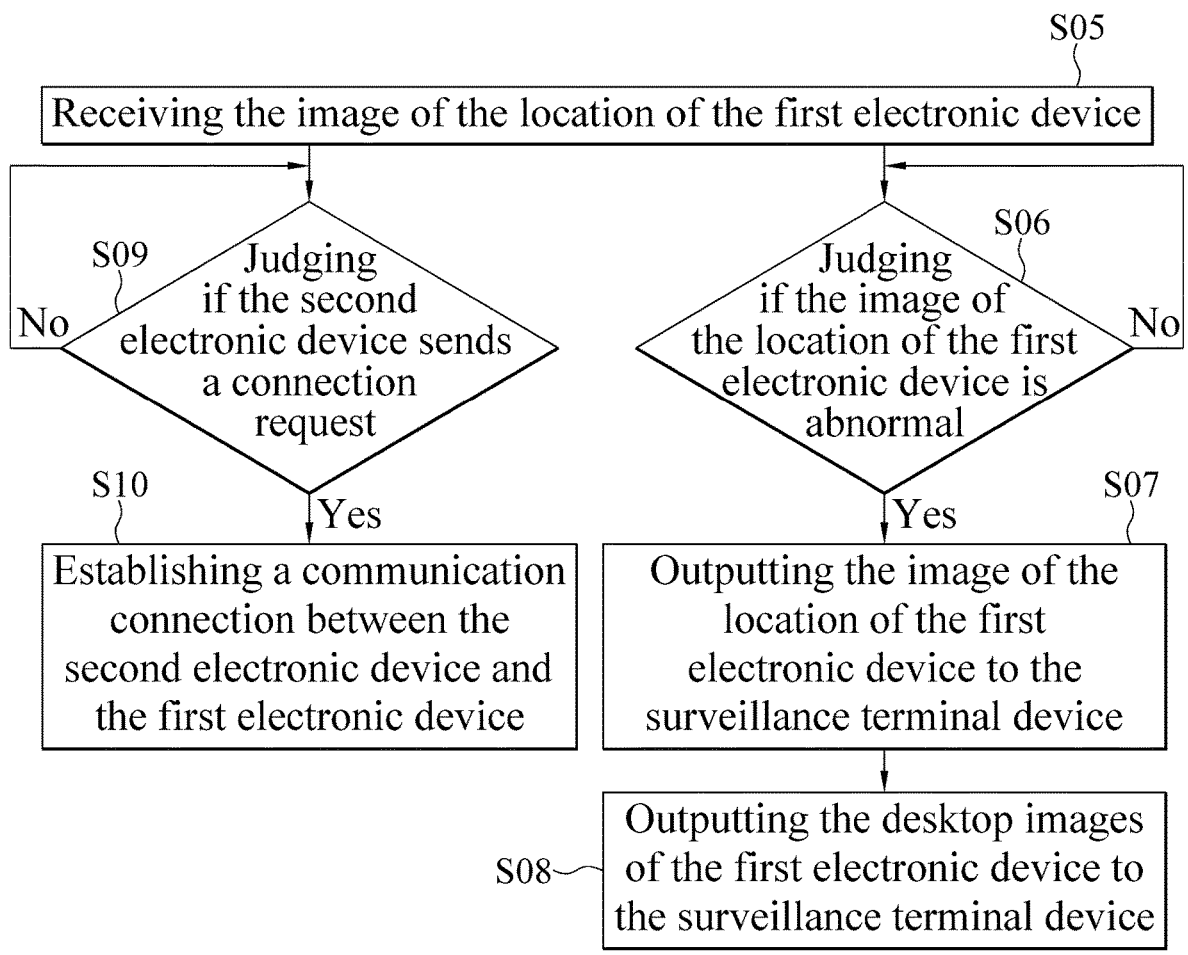
FIG. 5 illustrates a flowchart of a surveillance method of a surveillance system according to a second embodiment of the instant disclosure.

FIG. 5 illustrates a flowchart of a surveillance method of a surveillance system according to a second embodiment of the instant disclosure. Please refer to FIGS. 1 and 5. In the second embodiment, the multi-computer switching unit 14 may be adapted to establish the communication connection between the second electronic device 12 and the first electronic device 11, and the multi-computer switching unit 14 may be also adapted to establish the communication connection between the third electronic device 13 and the first electronic device 11. That is, in this embodiment, after the third electronic device 13 sends the connection request, the first electronic device 11 and the third electronic device 13 performs a handshake. After the handshake for confirming the admission of the communication connection, the first electronic device 11 and the third electronic device 13 can establish the communication connection; that is, the first electronic device 11 is communicable with the third electronic device 13.

The multi-computer switching unit 14 judges if the second electronic device 12 or the third electronic device 13 sends the connection request (step S09). When the second electronic device 12 sends the connection request (that is, the judgement result in the step S09 is "yes"), the multi-computer switching unit 14 establishes the communication connection between the second electronic device 12 and the first electronic device 11 (step S10). When the third electronic device 13 sends the connection request (that is, the judgement result in the step S09 is "yes"), the multi-computer switching unit 14 establishes the communication connection between the third electronic device 13 and the first electronic device 11 (step S10).

Figure 6:
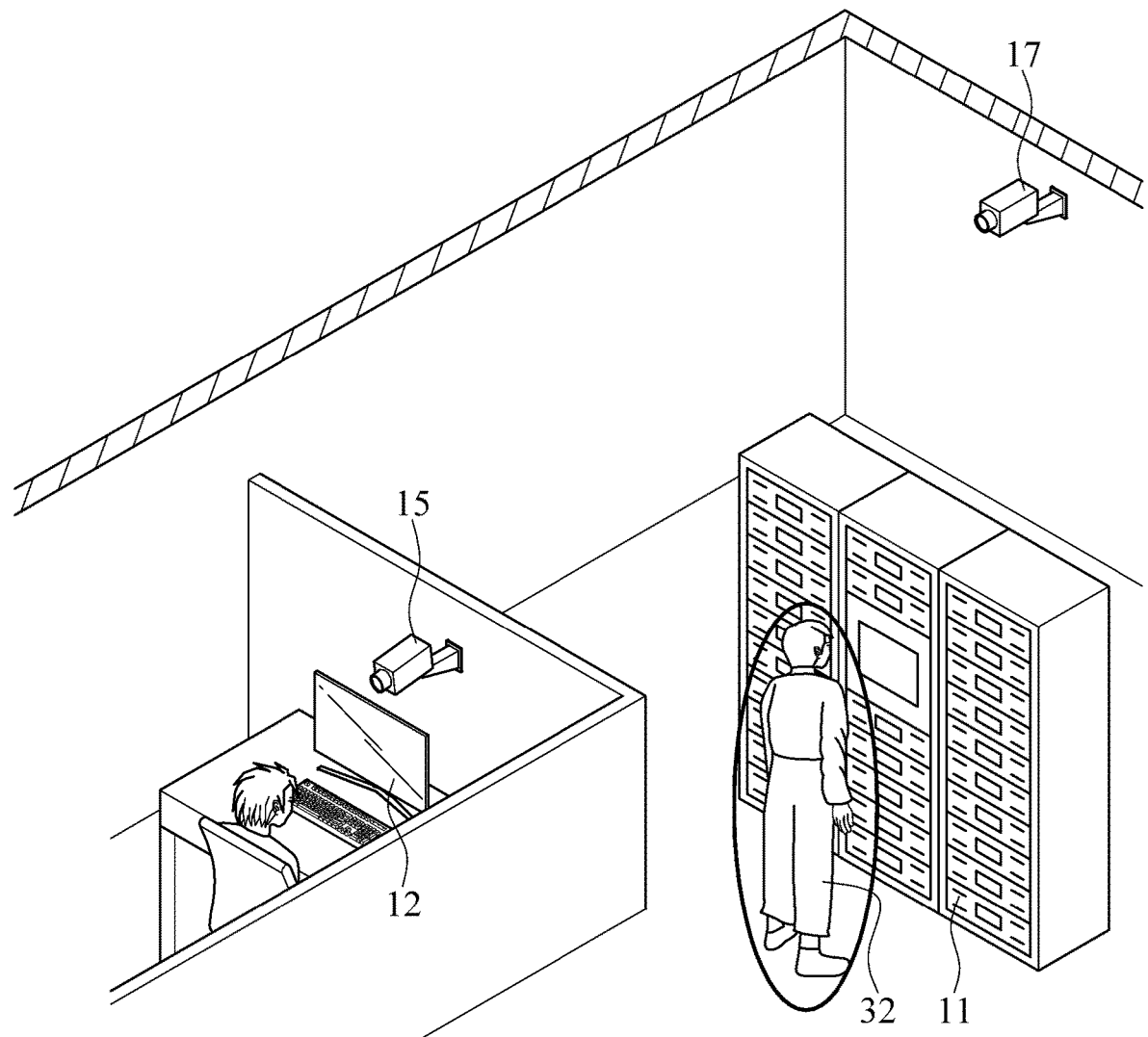
FIG. 6 illustrates a schematic view showing that another implementation of the surveillance system according to an exemplary embodiment is applied in an office.

Furthermore, the image-capturing unit 15 corresponds to the first electronic device 11 to capture an image of a location of the first electronic device 11. The image-capturing unit 15 further sends the image of the location of the first electronic device 11 to the multi-computer switching unit 14. The multi-computer switching unit 14 receives the image of the location of the first electronic device 11 from the image-capturing unit 15 (step S05), and the multi-computer switching unit 14 judges if the image of the location of the first electronic device 11 is abnormal (step S06). For example, as shown in FIG. 6, when a person 32 comes close to the first electronic device 11 and tends to operate the first electronic device 11, the multi-computer switching unit 14 can thus judge that the image of the location of the first electronic device 11 is abnormal (that is, the judgement result in the step S06 is "yes") because the person 32 comes close to the first electronic device 11. Then, the multi-computer switching unit 14 outputs the image of the location of the first electronic device 11 to the surveillance terminal device 16 (step S07), so that the personnel at the surveillance terminal device 16 can perform an instant treatment for the situation. Hence, the personnel at the surveillance terminal device 16 does not have to playback all the images captured by the image-capturing unit 14 for searching the person who remote operates the first electronic device 11, that is, the personnel at the surveillance terminal device 16 does not have to search the image of the person who comes close the first electronic device 11 in the huge image data sent to the surveillance terminal device 16, thereby improving the convenience and the reliability of the surveillance system.

In one embodiment, the image of the location of the first electronic device 11 contains the image of an adjacent location of the location of the first electronic device 11, and the person can operate the first electronic device 11 at the adjacent location. Taking the case that the first electronic device 11 is located in an office as an example, the image of the location of the first electronic device 11 may contain the image of any location in the office. Taking that the first electronic device 11 is located in the computer facilities as another example, the image of the location of the first electronic device 11 may contain the image of any location in the computer facilities. In other words, the image-capturing units 15, 17 are disposed at a place of the location of the first electronic device 11, and the image-capturing units 15, 17 are adapted to obtain and utilize the image of the person who uses the first electronic device 11 anytime.

In one embodiment, the first electronic device 11 further generates desktop images thereof, and the first electronic device 11 further sends the desktop images to the multi-computer switching unit 14. In the step S05, the multi-computer switching unit 14 further receives the desktop images sent by the first electronic device 11. When the multi-computer switching unit 14 judges that the image of the location of the first electronic device 11 is abnormal, the multi-computer switching unit 14 further outputs the desktop images of the first electronic device 11 to the surveillance terminal device 16, so that the surveillance terminal device 16 displays the desktop images of the first electronic device 11. Hence, the personnel at the surveillance terminal device 16 can realize the sequential operations on the first electronic device 11 by the person according to the desktop images of the first electronic device 11. For example, if the person who operates the first electronic device 11 connects a portable storage device (e.g., a flash disk or a portable hard disk) to the first electronic device 11 to access the data stored in the first electronic device 11, the personnel at the surveillance terminal device 16 can realize that the sequential operations indicating a portable storage device connects to the first electronic device 11 and copies the data in the first electronic device 11 to the portable storage device.

In one embodiment, as mentioned, the multi-computer switching unit 14 may output the image of the location of the first electronic device 11, the desktop images of the first electronic device 11, and the facial image of the person 32 to the surveillance terminal device in the highlighted manner, detailed descriptions are omitted.

In one embodiment, in the step S05, the multi-computer switching unit 14 periodically receives a plurality of images of the location of the first electronic device 11, and in the step S06, the multi-computer switching unit 14 judges if the images are the same or not. If the images of the location of the first electronic device 11 at different timings are the same, indicating that the images are not changed, that is, no one comes close to the first electronic device 11. Conversely, in the case that the images of the location of the first electronic device 11 at different timings are not the same, indicating that someone comes close to the first electronic device 11 to cause the change of the images of the location of the first electronic device 11. In other words, in this embodiment, the multi-computer switching unit 14 can judge if the images of the location of the first electronic device 11 are abnormal according to whether the images of the location of the first electronic device 11 change, so that the multi-computer switching unit 14 can judge if a person comes close to the first electronic device 11.

Figure 7:
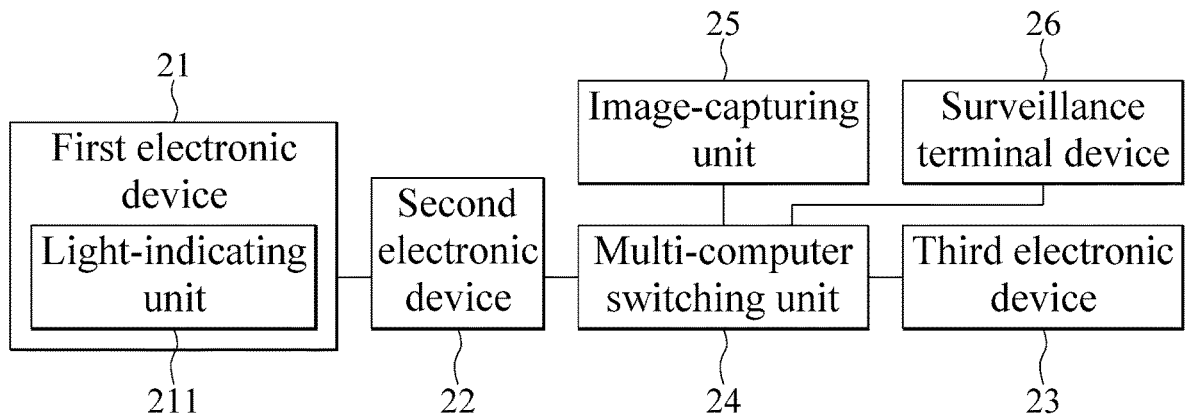
FIG. 7 illustrates a block diagram of the surveillance system of the second embodiment.

FIG. 7 illustrates a block diagram of the surveillance system of the second embodiment. Please refer to FIG. 7, in this embodiment, the surveillance system comprises three electronic devices 21, 22, 23 (hereinafter, a first electronic device 21, a second electronic device 22, and a third electronic device 23), a multi-computer switching unit 24, and an image-capturing unit 25. The surveillance system is coupled to a surveillance terminal device 26. Specifically, in this embodiment, the second electronic device 22 is coupled between the first electronic device 21 and the multi-computer switching unit 24, and the multi-computer switching unit 24 is coupled to the third electronic device 23, the image-capturing unit 25, and the surveillance terminal device 26.

Figure 8:
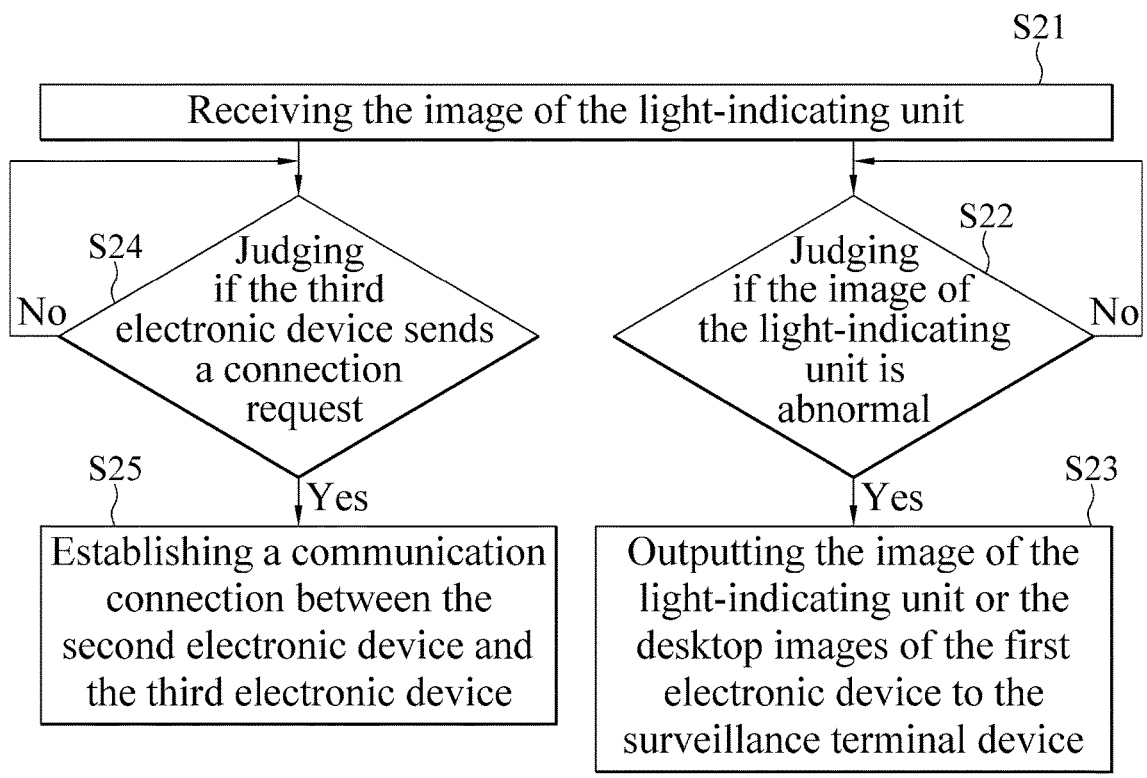
FIG. 8 illustrates a flowchart of a surveillance method of a surveillance system according to a third embodiment of the instant disclosure.

The third electronic device 23 can establish a communication connection with the second electronic device 22 through the multi-computer switching unit 24. In other words, the multi-computer switching unit 24 is adapted to establish the communication connection between the second electronic device 22 and the third electronic device 23. Accordingly, please refer to FIGS. 7 and 8, where FIG. 8 illustrates a flowchart of a surveillance method of a surveillance system according to a third embodiment of the instant disclosure. As shown in FIGS. 7 and 8, the multi-computer switching unit 24 judges if the third electronic device 23 sends the connection request (step S24). When the third electronic device 23 sends the connection request (i.e., the judgement result in the step S24 is "yes"), the multi-computer switching unit 24 establishes the communication connection between the second electronic device 22 and the third electronic device 23 (step S25). Accordingly, the user of the third electronic device 23 can operate the second electronic device 22 through the input device of the third electronic device 23.

On the other hand, the first electronic device 21 comprises a light-indicating unit 211, and the light-indicating unit 211 is adapted to indicate if the first electronic device 21 is abnormal. For example, the light-indicating unit 211 can indicate that the first electronic device 21 is normal or abnormal with different light signals. Alternatively, the light-indicating unit 211 may not to present a light signal or to present the light signal to indicate that the first electronic device 21 is normal or is abnormal, respectively. Moreover, the second electronic device 22 can display the desktop images thereof, and the desktop images of the second electronic device 22 contain the operation state indicating that if the first electronic device 21 is normal or abnormal, that is, the desktop images of the second electronic device 22 can indicate the operation state to show if the first electronic device 21 is normal or abnormal.

The image-capturing unit 25 corresponds to the first electronic device 21 so as to capture the image of the light-indicating unit 211. The image-capturing unit 25 sends the image of the light-indicating unit 211 to the multi-computer switching unit 24. The multi-computer switching unit 24 receives the image of the light-indicating unit 211 from the image-capturing unit 25 (step S21) and the desktop images from the second electronic device 22. The multi-computer switching unit 24 then judges if the image of the light-indicating unit 211 is abnormal (step S22). When the multi-computer switching unit 24 judges that the image of the light-indicating unit 211 is abnormal (i.e., the judgement result in the step S22 is "yes"), the multi-computer switching unit 24 outputs the image of the light-indicating unit 211 to the surveillance terminal device 26 (step S23), or the multi-computer switching unit 24 outputs the desktop images of the second electronic device 22 to the surveillance terminal device 26. Therefore, the personnel at the surveillance terminal device 26 can instantly realize that the first electronic device 21 is abnormal to perform treatments for the situation.

In one embodiment, the second electronic device 22 may be coupled to the surveillance terminal device 26. When the multi-computer switching unit 24 judges that the image of the light-indicating unit 211 is abnormal (i.e., the judgement result in the step S22 is "yes"), the multi-computer switching unit 24 may also control the second electronic device 22 to send the desktop images of the second electronic device 22 to the surveillance terminal device 26 directly.

In one embodiment, the image-capturing unit 25 periodically sends a plurality of images of the light-indicating unit 211 to the multi-computer switching unit 24. In the step S21, the multi-computer switching unit 24 periodically receives the images of the light-indicating unit 211. In the step S22, the multi-computer switching unit 24 judges if the images of the light-indicating unit 211 are the same or not. The multi-computer switching unit 24 judges if the images of the light-indicating unit 211 is abnormal by judging that if the images of the light-indicating unit 211 is changed or not. Taking that the first electronic device 21 is normal or abnormal with different light signals (hereinafter, a first light signal and a second light signal) as an example, when the light signal of the light-indicating unit 211 changes from the first light signal to the second light signal, the multi-computer switching unit 24 judges that the images of the light-indicating unit 211 at different timings are not the same, that is, the images of the light-indicating unit 211 change, so that the multi-computer switching unit 24 can judge that the images of the light-indicating unit 211 are abnormal. Moreover, taking the case that the light-indicating unit 211 displays a light signal or not to display the light signal to respectively indicate that the first electronic device 21 is normal or abnormal as an example, when the light-indicating unit 211 changes from not to present the light signal to present the light signal, the multi-computer switching unit 24 judges that the images of the light-indicating unit 211 at different timings are not the same, that is, the images of the light-indicating unit 211 change, so that the multi-computer switching unit 24 can judge that the images of the light-indicating unit 211 are abnormal.

In one embodiment, in the step S24, the multi-computer switching unit 24 may judge if the third electronic device 23 sends the control signal to judge if the third electronic device 23 sends the connection request.

Figure 9:
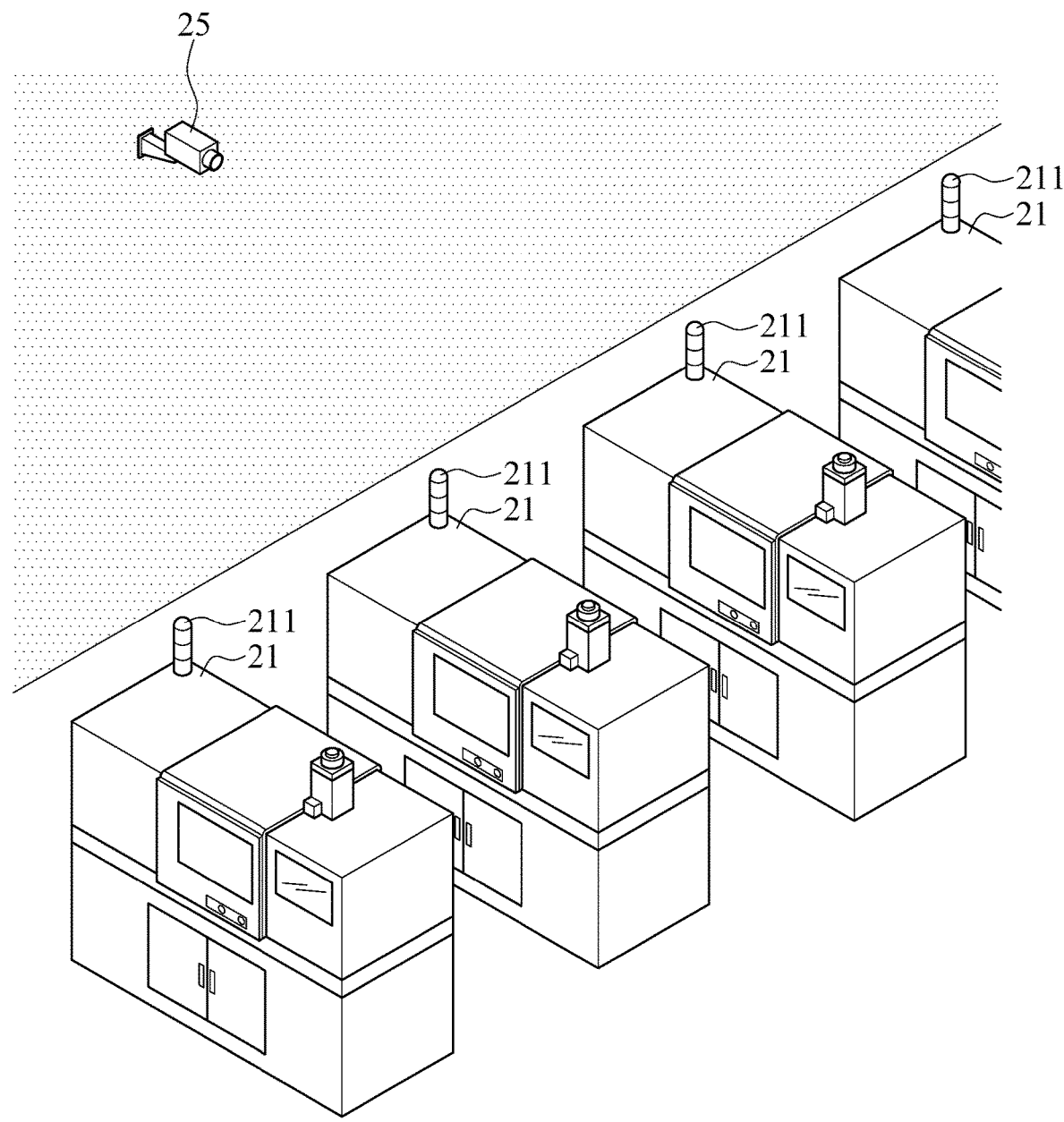
FIG. 9 illustrates a schematic view of one implementation of the first electronic device in FIG. 7.

In one embodiment, as shown in FIG. 9, the first electronic device 21 may be a machine. The second electronic device 22 may be a personal computer, an industrial computer, or a tablet computer adapted to control the first electronic device 21.

In one embodiment, the light-indicating unit 211 is adapted to indicate if the mains supply fails or not. For example, the light-indicating unit 211 may indicate the mains supply to be in a normal condition or a failed condition with the first light signal or the second light signal. Alternatively, the light-indicating unit 211 may indicate the mains supply to be in the normal condition or the failed condition with presenting the light signal or not to presenting the light signal. Accordingly, when the mains supply fails, the light signal of the light-indicating unit 211 changes from the first light signal to the second light signal, or the light-indicating unit 211 changes from not to present the light signal to present the light signal. Hence, in the step S22, the multi-computer switching unit 24 judges that the images of the light-indicating unit 211 at different timings are not the same, that is, the images of the light-indicating unit 211 change, so that the multi-computer switching unit 24 can judge that the mains supply fails according to the abnormality of the images of the light-indicating unit 211. Moreover, when the mains supply fails, the multi-computer switching unit 24 can further control the second electronic device 22 and the third electronic device 23 to perform a data backup procedure or a shutdown procedure.

Based on the above, according to one or some embodiments of the instant disclosure, the multi-computer switching unit is adapted to integrate the image generated by the image-capturing unit with the desktop images of the electronic device. Furthermore, the multi-computer switching unit is adapted to responsively provide the image for the surveillance terminal device in the highlighted manner according to different events. Moreover, the multi-computer switching unit is adapted to control the electronic device to perform a backup procedure or a shutdown procedure, thereby improving the convenience and the reliability of the surveillance system as well as improving the safety for the monitored objects and regions. Additionally, using the integration and connection between the image-capturing unit, the multi-computer switching unit, and the electronic devices in the system, excessive costs for complicated and expensive equipment and algorithms can be saved.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A surveillance system, comprising:
    a first electronic device;
    a second electronic device;
    an image-capturing unit adapted to capture an image of a location of the second electronic device; and
    a multi-computer switching unit coupled to the first electronic device, the second electronic device, and the image-capturing unit, wherein the multi-computer switching unit is adapted to receive the image from the image-capturing unit;
    wherein when the second electronic device sends a connection request for establishing a communication connection with the first electronic device, the second electronic device and the first electronic device establish the communication connection through the multi-computer switching unit, and the multi-computer switching unit outputs the image corresponding to the second electronic device to a surveillance terminal device;
    wherein the multi-computer switching unit periodically receives a plurality of desktop images from the first electronic device; wherein when the desktop images are not the same, the multi-computer switching unit outputs the desktop images to the surveillance terminal device.

2. The surveillance system according to claim 1, wherein the desktop images include an image of input interface of the first electronic device.

3. The surveillance system according to claim 2, further comprising a third electronic device coupled to the multi-computer switching unit, wherein the image-capturing unit further corresponds to the third electronic device, and the image-capturing unit is further adapted to capture a second image of a location of the third electronic device; wherein when the third electronic device sends a second connection request for establishing a second communication connection with the first electronic device, the third electronic device and the first electronic device establish the second communication connection through the multi-computer switching unit, and the multi-computer switching unit outputs the second image corresponding to the third electronic device to a surveillance terminal device.

4. The surveillance system according to claim 1, wherein the multi-computer switching unit is a network-type multi-computer switching unit; wherein when the second electronic device sends the connection request, the multi-computer switching unit judges an internet protocol address of the second electronic device sending the connection request, and the multi-computer switching unit selectively outputs the image to the surveillance terminal device according to the internet protocol address.

5. The surveillance system according to claim 4, further comprising a third electronic device coupled to the multi-computer switching unit, wherein the image-capturing unit further corresponds to the third electronic device, and the image-capturing unit is further adapted to capture a second image of a location of the third electronic device; wherein when the third electronic device sends a second connection request for establishing a second communication connection with the first electronic device, the third electronic device and the first electronic device establish the second communication connection through the multi-computer switching unit, and the multi-computer switching unit outputs the second image corresponding to the third electronic device to a surveillance terminal device.

6. The surveillance system according to claim 1, further comprising a third electronic device coupled to the multi-computer switching unit, wherein the image-capturing unit further corresponds to the third electronic device, and the image-capturing unit is further adapted to capture a second image of a location of the third electronic device; wherein when the third electronic device sends a second connection request for establishing a second communication connection with the first electronic device, the third electronic device and the first electronic device establish the second communication connection through the multi-computer switching unit, and the multi-computer switching unit outputs the second image corresponding to the third electronic device to a surveillance terminal device.

7. The surveillance system according to claim 1, wherein the multi-computer switching unit outputs the image to the surveillance terminal device, and the multi-computer switching unit displays the image on the surveillance terminal device in a highlighted manner.

* * * * *